United States Patent
McCollum

(10) Patent No.: US 9,106,232 B2
(45) Date of Patent: Aug. 11, 2015

(54) SONOS FPGA ARCHITECTURE HAVING FAST DATA ERASE AND DISABLE FEATURE

(71) Applicant: Microsemi SoC Corporation, San Jose, CA (US)

(72) Inventor: John McCollum, San Jose, CA (US)

(73) Assignee: Microsemi SoC Corporation, San Jose, CA (US)

( * ) Notice: Subject to any disclaimer, the term of this patent is extended or adjusted under 35 U.S.C. 154(b) by 0 days.

(21) Appl. No.: 14/481,943

(22) Filed: Sep. 10, 2014

(65) Prior Publication Data

US 2015/0084670 A1   Mar. 26, 2015

Related U.S. Application Data

(60) Provisional application No. 61/882,537, filed on Sep. 25, 2013.

(51) Int. Cl.
*H03K 19/177* (2006.01)

(52) U.S. Cl.
CPC ...... *H03K 19/17768* (2013.01); *H03K 19/1776* (2013.01); *H03K 19/17752* (2013.01)

(58) Field of Classification Search
CPC ........... H03K 19/177; H03K 19/17768; G06F 2221/2143
USPC ................................................ 326/8, 38, 41
See application file for complete search history.

(56) References Cited

U.S. PATENT DOCUMENTS

| | | | |
|---|---|---|---|
| 5,185,717 A | 2/1993 | Mori | |
| 7,752,407 B1 * | 7/2010 | Langhammer et al. | 711/164 |
| 7,929,345 B2 | 4/2011 | Issaq | |
| 8,896,346 B1 * | 11/2014 | Lewis et al. | 326/41 |
| 2007/0086257 A1 | 4/2007 | Bernier et al. | |
| 2007/0288765 A1 * | 12/2007 | Kean | 713/193 |
| 2010/0132047 A1 | 5/2010 | Rodriguez et al. | |
| 2010/0195404 A1 | 8/2010 | Lee | |
| 2012/0274350 A1 * | 11/2012 | Reese et al. | 326/8 |

FOREIGN PATENT DOCUMENTS

DE   10 2012 006225   10/2012

OTHER PUBLICATIONS

European Patent Office, International Search Report issued in PCT/US2014/056954, Dec. 5, 2014, pp. 1-4.
European Patent Office, Written Opinion issued in PCT/US2014/056954, Dec. 5, 2014, pp. 1-7.

* cited by examiner

*Primary Examiner* — Don Le
(74) *Attorney, Agent, or Firm* — LeechTishman Fuscaldo & Lampl; Kenneth D'Alessandro, Esq.

(57) ABSTRACT

A method for fast data erasing an FPGA including a programmable logic core controlled by a plurality of SONOS configuration memory cells, each SONOS configuration memory cell including a p-channel SONOS memory transistor in series with an n-channel SONOS memory transistor, which includes detecting tampering with the FPGA, disconnecting power from the programmable logic core, and simultaneously programming the n-channel device and erasing the p-channel device in all cells.

20 Claims, 2 Drawing Sheets

SONOS FPGA ARCHITECTURE HAVING FAST DATA ERASE AND DISABLE FEATURE

CROSS REFERENCE TO RELATED APPLICATIONS

This application claims the benefit of U.S. Provisional Patent Application No. 61/882,537, filed Sep. 25, 2013, which is hereby incorporated by reference in its entirety.

BACKGROUND OF THE INVENTION

1. Field of the Invention

The present invention relates to programmable logic device (PLD) integrated circuits such as field programmable gate array (FPGA) integrated circuits. More particularly, the present invention relates to such integrated circuits employing Silicon-Oxide-Nitride-Oxide-Silicon (SONOS) transistors as programmable memory elements and to a fast data erase and disable procedure for use with such integrated circuits.

2. Description of Related Art

A typical SONOS memory cell is a push-pull configuration and includes a p-channel SONOS memory transistor in series with an n-channel SONOS memory transistor. The n-channel SONOS memory transistor includes n+ source and drain regions formed in a p-well, with a gate between them. The p-well is formed in an n-type deep well to isolate the p-well from the p-type substrate to allow negative voltages to be applied to the n+ junctions.

When the memory cell is configured to turn the p-channel memory transistor to its on state and the n-channel memory transistor to its off state, the n-channel switch transistor connected to the push-pull cell is turned on because the p-channel memory transistor couples the gate of the switch transistor to $V_{DD}$. Conversely, when the memory cell is configured to turn the p-channel memory transistor to its off state and the n-channel memory transistor to its on state, the n-channel switch transistor connected to the push-pull cell is turned off because the n-channel memory transistor couples the gate of the switch transistor to ground. By convention, programming a memory transistor places it in its "off" state and erasing a memory transistor places it in its "on" state.

In prior-art schemes, both the p-channel and n-channel transistors in the cell are erased and then one of them is programmed depending on the desired state of the memory cell. To erase the n-channel memory transistor to its on state, −3.9V is applied to its gate and +3.6V is applied to its p-well. The pn junction between the p-well and the drain of the n-channel memory transistor is forward biased and thus the drain of the n-channel memory transistor is at a potential of about 3V, which also appears on the gate of the switch transistor to which it is directly connected. To erase the p-channel memory transistor to its on state, a potential of +7.5V is applied to its gate and 0V is applied to its n-well. To program the p-channel memory transistor to its off state, −3.9V is applied to its gate, with its drain/source diffusion held at +3.6V. To program the n-channel memory transistor to its off state, +3.9V is placed on its gate, with the drain/source diffusion at −3.6V. Programming takes a relatively long time because the data has to be decoded at a word line level and therefore programming all transistors must be done sequentially. Erasing can be performed on all p-channel devices simultaneously, but erasing all of the n-channel devices has to be done in many steps to avoid overly large current draw from the programming voltage source. This large current draw is due to the electron tunneling gate leakage on the switch transistor that occurs from the approximately 3V appearing on the gates of the switch transistors. Persons of ordinary skill in the art will appreciate that the magnitudes of these voltages will vary somewhat depending on scaling factors and biases applied, which will shift the voltages by superposition.

During the process of erasing the n-channel memory transistor, leakage is caused in the switch transistors, when thin gate oxides (i.e., 2 nm) are employed in the switch transistors, due to the high voltage (approximately 3V) applied to their gates. With the n-channel memory transistor turned off and the p-channel memory transistor turned on, the $V_{DD}$ potential applied to the push-pull cell is passed through to the gate of the switch transistor, thus turning on the switch transistor to provide a low impedance path from its source to drain. Because some of the switches are used to connect the programmable interconnect conductors to one another and other ones of the switches are used to connect the outputs of logic modules to ones of the interconnect conductors, the condition where all of the switches are turned on results in all routing tracks being connected together and all logic module outputs being connected together. In addition, because other ones of the switches define the functions and inputs of the logic modules, random numbers of the logic module outputs will be at logic high and logic low levels, and the logic power supply will have many (usually millions) of low impedance paths to ground, making the chip appear as a short circuit to the power supply.

This switch leakage does not appear when erasing the p-channel because 0V is placed on the source/drain diffusions of the push-pull transistors and thus appears at the gate of the switch transistor, assuring that the switch transistor gate is unstressed and does not leak during the erase procedure.

FPGAs are used extensively in digital systems. Since they are user configurable they have the advantage in development and production that the system manufacturer can change their design to correct for bugs or to just upgrade the functionality for changing needs. This has an added benefit in that the system manufacturer has total control of the design, such that a would-be copier cannot just buy the same parts, but also must know what is contained in the configuration of the FPGA. Thus, it has become important in military and commercial systems to protect the secrecy of the design. FPGA manufacturers have used various methods of encrypting the design or protecting on-chip configuration memory from a copier simply copying the configuration memory. Copiers have become very sophisticated in tampering with devices in attempts to obtain the contents of the configuration memory. Therefore, system manufacturers and FPGA manufactures have designed various methods of detecting tampering and erasing the configuration memory in the event that tampering is detected so the copier cannot reverse engineer the FPGA design.

Accordingly, in high-security applications it would be desirable to be able to quickly erase the contents of FPGA devices, particularly if tampering has been detected. In presently available deep sub-micron NVM FPGAs, such as the FLASH-based FPGA products designed and marketed by Microsemi Corporation, quickly erasing the p-channel and n-channel memory transistors can be difficult because the large plurality of memory transistors is not erased at the same time but require hundreds of pulses over a period of many seconds because of the presence of high voltages and leakage currents which prevent the erase procedure from being completed in much less than a second, perhaps allowing a copier to extract the configuration data or to turn off the power to the integrated circuit to avoid security mechanisms on the chip erasing the configuration memory.

SUMMARY OF THE INVENTION

A method for fast data erasing an FPGA including a programmable logic core controlled by a plurality of SONOS configuration memory cells, each SONOS configuration memory cell including a p-channel SONOS transistor in series with an n-channel SONOS memory transistor. The method includes detecting tampering with the FPGA, disconnecting $V_{DD}$ from the programmable logic core, and simultaneously programming the n-channel device and erasing the p-channel device in all cells. The method may also include reconnecting $V_{DD}$ to the programmable logic core after simultaneously programming the n-channel device and erasing the p-channel device in all cells.

DESCRIPTION OF THE INVENTION

Persons of ordinary skill in the art will realize that the following description of the present invention is illustrative only and not in any way limiting. Other embodiments of the invention will readily suggest themselves to such skilled persons.

Figure 1:
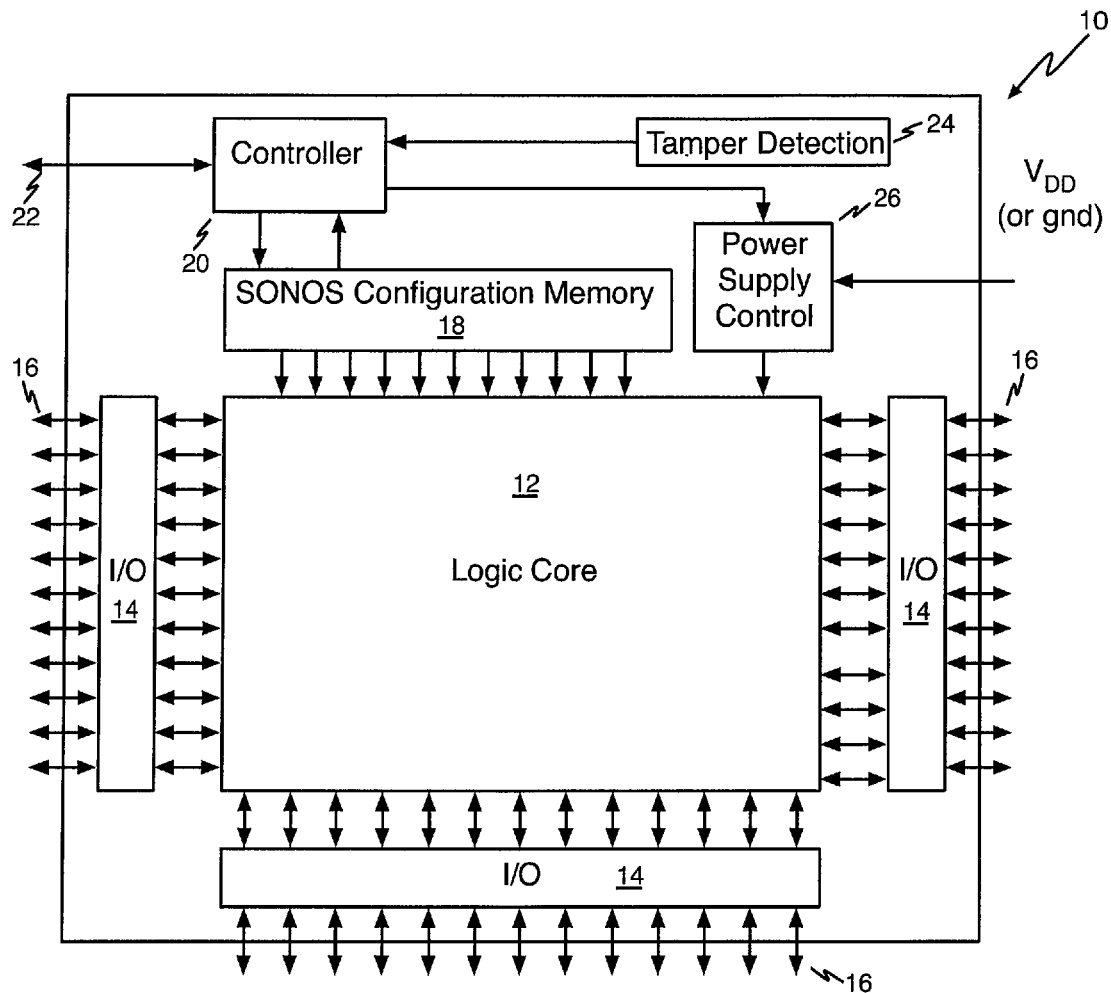
FIG. 1 is a block diagram of an illustrative FPGA having a SONOS configuration memory and in which the invention can be implemented.

Referring first to FIG. 1, a block diagram shows an illustrative FPGA 10 according to the present invention. FPGA 10 includes a logic core 12. Logic core 12 includes numerous programmable logic elements as is known in the art. Logic core 12 communicates with I/O blocks 14 that condition, buffer, or otherwise transfer data on and off of the integrated circuit via a plurality of I/O pins 16. Persons of ordinary skill in the art will immediately appreciate that the size of the logic core 12 and the I/O blocks 14, as well as the number of I/O pins 16, are merely a matter of design choice for a skilled FPGA designer.

The functions and interconnectivity of the programmable logic elements in the logic core 12 are defined by configuration data that is stored in a SONOS configuration memory 18. The state of each memory bit is used to control one or more switch transistors. The switch transistors are selectively turned on responsive to the SONOS configuration memory 18 to either define the functions of the programmable logic elements or make programmable connections between the inputs and outputs of the logic elements and the I/O blocks 14. Memory bits in the SONOS configuration memory 18 may also be used to configure circuitry in the I/O blocks 14 as is known in the art. While in FIG. 1, the SONOS configuration memory 18 is shown for conceptual purposes as a block separate from the logic core block 12, persons of ordinary skill in the art will immediately appreciate that SONOS configuration memory 18 could be located in a region of the integrated circuit separate from the logic core block 12 or could be physically dispersed throughout the logic core block 12.

A controller 20 is on board the integrated circuit and, among other things, is used to direct the programming and erasing of the configuration data in the SONOS configuration memory 18 in the FPGA 10. The controller 20 communicates off chip by a bus 22, which may be any one of a number of well-known bus configurations, such as JTAG, without limitation, that may be used for this purpose.

As previously noted, in some applications, including high security applications where the configuration data is valuable and proprietary, it is desirable to be able to quickly erase the contents of FPGA devices, particularly if tampering has been detected. The normal erase speed in prior art FPGA devices is not high enough to prevent downloading of all or some of the configuration data from the FPGA. Persons of ordinary skill in the art will also appreciate that there are other situations in which a high speed erase capability for an FPGA may be desirable.

Included in the integrated circuit is a tamper detection circuit 24. The function of the tamper detection circuit 24 is to detect that an attempt is being made to tamper with the integrated circuit, such as by unsealing and opening the package, cycling the power supply to the integrated circuit, or by other means. Any of a number of algorithms or switch mechanisms may be used for this purpose. Persons of ordinary skill in the art will readily be able to configure the tamper detection circuit 24 depending on what tampering conditions are desired to be sensed and acted on by the present invention. When such tampering has been detected, the tamper detection circuit 24 sends a signal, such as a set flag, to the controller 20. The controller 20 then implements the fast data erasing of the push-pull memory cells of the SONOS configuration memory 18, described further below.

According to one aspect of the present invention, the n-channel SONOS memory transistors are all programmed (turned off) while the p-channel SONOS memory transistors are simultaneously erased (turned on).

Figures 2A, 2B:
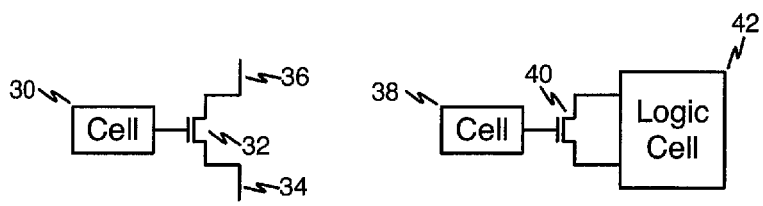
FIGS. 2A and 2B are, respectively, diagrams showing a SONOS memory cell having its switch transistor to selectively connect two interconnect conductors and to configure a logic module.

Referring now to FIGS. 2A and 2B, diagrams show a SONOS memory cell having its switch transistor wired to selectively connect two interconnect conductors, and to configure a logic module, respectively. In FIG. 2A, a SONOS memory cell 30 has a switch transistor 32 connected between two interconnect conductors 34 and 36, which are connected together when the switch transistor 32 is turned on. In FIG. 2B, a SONOS memory cell 38 has a switch transistor 40 connected to two internal circuit nodes of a logic module 42. Logic module 42 may be selectively configured, as is known in the art, by the state of switch transistor 40.

Figure 3:
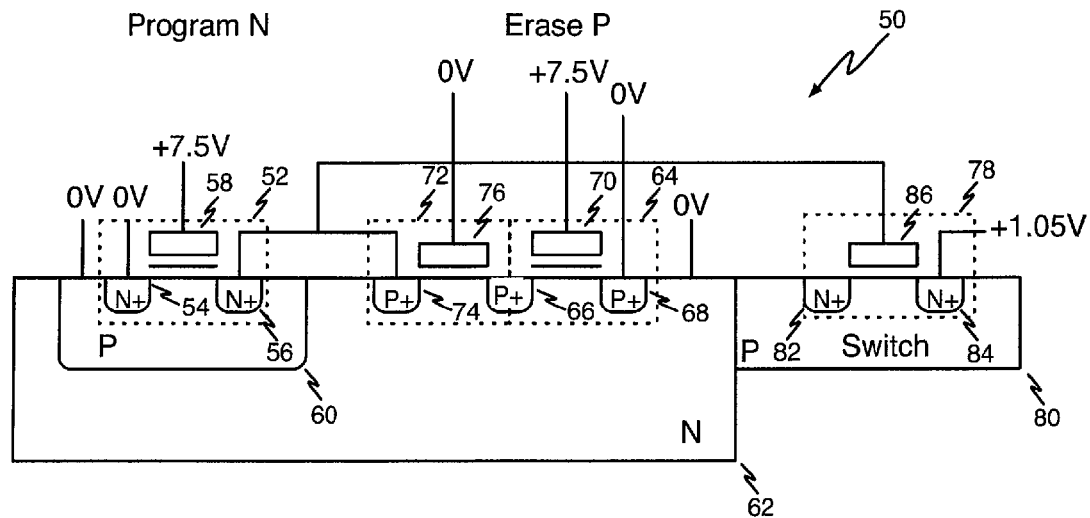
FIG. 3 is a cross-sectional diagram of a SONOS memory cell showing voltages applied to perform the fast erase procedure in accordance with the present invention.

Referring now to FIG. 3, a cross-sectional diagram of a SONOS memory cell 50 shows voltages applied to perform the fast erase procedure in accordance with the present invention. The SONOS memory cell 50 includes an n-channel SONOS memory transistor 52 including an n+ source region 54 and an n+ drain region 56 and a control gate 58 formed in a p-well 60. The p-well 60 is disposed in an n-type substrate 62, which itself can be a well region. A p-channel SONOS memory transistor 64 disposed in the n-type substrate 62 includes a p+ drain region 66 and a p+ source region 68, and a control gate 70. A volatile MOS p-channel transistor 72 having the p-type region 66 as its source and a p+ region 74 as its drain, also including a control gate 76, is used to switchably connect the p-channel and n-channel SONOS memory transistors 52 and 64 together in series during operation of the memory cell 50. The volatile MOS p-channel transistor 72 is used to keep the drain-to-well junction voltage of the p-channel SONOS memory transistor 64 below 1 volt to prevent hot electron generation, which would eventually turn it on. The function of the volatile MOS p-channel transistor 72 to reduce stress is described in U.S. Pat. No. 8,320,178 issued Nov. 27, 2012 entitled "Push-Pull Programmable Logic Device Cell", the entire contents of which is incorporated herein by reference.

An n-channel switch transistor 78 is formed in a separate p-well 80 and includes an n+ source region 82, an n+ drain region 84, and a gate 86. The gate 86 of the n-channel switch transistor 78 is connected to the drain 56 of the n-channel SONOS memory transistor 52 and switchably connected to the drain 66 of the p-channel SONOS memory device 64 through the volatile MOS p-channel transistor 72. As will be appreciated by persons of ordinary skill in the art, the switch transistors 78 in the SONOS memory cells 50 are used to either configure the logic function of the programmable logic modules in the FPGA integrated circuit or to selectively connect together programmable interconnect conductors to form circuits using multiple ones of the programmable logic elements and to route input and output signals to and from the circuits from off chip as described above.

Figure 4:
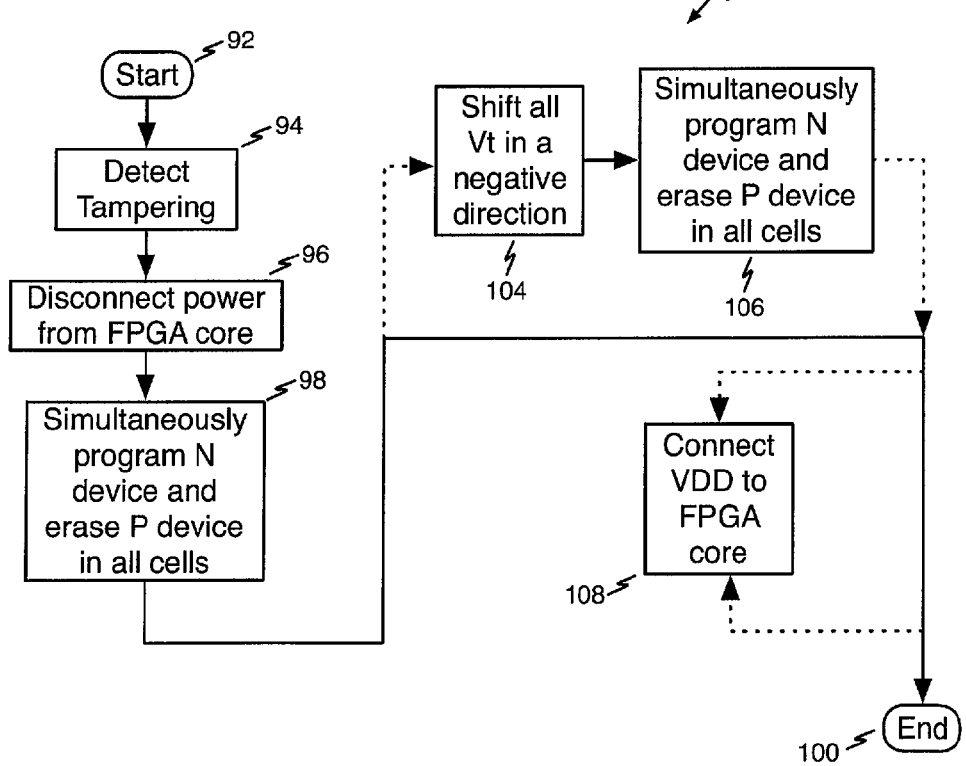
FIG. 4 is a flow diagram showing the fast erase procedure in accordance with the present invention.

According to one aspect of the present invention, fast data erasing of the push-pull SONOS configuration memory cells in the FPGA may be accomplished in response to detecting a tampering attempt as may be seen from a consideration of FIGS. 1 and 3, along with FIG. 4, a flow chart showing an exemplary fast erase procedure 90 in accordance with one aspect of the present invention.

The process begins at reference numeral 92. At reference numeral 94, the tamper detection circuit 24 of FIG. 1 sets a flag or otherwise communicates to the controller 20 that a tampering attempt has been detected. At reference numeral 96, the controller 20 acts to remove power from the logic core 12. As shown in FIG. 1, power to the logic core 12 may be disconnected by interrupting power to the logic core via a power supply control block 26. Persons of ordinary skill in the art will appreciate that power may be disconnected from the logic core 12 by interrupting either the $V_{DD}$ or the ground connection to the logic core.

At reference numeral 98, controller 20 acts to simultaneously program (turn off) the n-channel SONOS memory transistor and erase (turn on) the p-channel SONOS memory transistor in all cells in the SONOS configuration memory 18. In a typical 28 nm SONOS technology, this may be accomplished as seen in FIG. 2. The process ends at reference numeral 100.

In the particular embodiment shown, a potential of +7.5V is applied to the gates 58 and 70 of both the n-channel and p-channel SONOS memory transistors 52 and 64. A potential of about 0V is applied to the p-well 60, the source 54 of the n-channel SONOS memory transistor 52, the n-well 62, and to the gate 76 of the volatile MOS p-channel transistor 72. The voltage at the gate of p-channel transistor 72 is applied to prevent gate stress on that device and 0V is a convenient available voltage. The potential applied to the gates 58 and 70 is a programming potential that turns "off" all the n-channel memory transistors 52 and an erase potential that turns "on" all the p-channel memory transistors 64. The drain 84 of the n-channel switch transistor 78 is also set to about 0V. In embodiments of the invention where the gates 86 of the switch transistors are thin (e.g., about 2 nm or less), the problem of switch leakage is prevented because disconnecting the power from the logic core inherently applies one of a potential of either 0V or the nominal logic core $V_{DD}$ (e.g., 1.05V) to the drain 84 of the switch transistors 78 depending upon whether the designer has chosen to disconnect ground or $V_{DD}$ from the core during programming. Turning "off" all the n-channel memory transistors and turning "on" all the p-channel memory transistors turns all the switch transistors 78 on, and makes the entire FPGA device inoperable, in a single 10 mS pulse.

This process of memory data destruction leaves a residual effect that could be analyzed by a copier to discover the original data. An additional step shown at reference numeral 104 may be performed to shift all of the voltage thresholds of the SONOS memory transistors in a negative direction followed by repeating the original procedure to minimize this residual effect as shown at reference numeral 106. This additional step may be performed by placing 1.05V on the drains 56 and 68 of the memory transistors 52 and 64, respectively, and −4.65V on their respective gates 58 and 70 for a period which may be about 10 mS.

As shown at reference numeral 106, subsequent to the additional step, a repeat of the programming of the n-channel SONOS memory transistor 52 and erasing of the p-channel SONOS memory transistor 64 may be performed. Again, in the particular embodiment shown, the potential of +7.5V may again be applied to the gates 58 and 70 of both the n-channel and p-channel SONOS memory transistors 52 and 64, respectively, while a potential of 0V is applied to each of p-well 60, source 54 of the n-channel SONOS memory transistor 52, n-well 62, source 68 of the p-channel SONOS memory transistor 64, and to the gate 76 of the volatile MOS p-channel transistor 72 to assure programming (turn off) of all the n-channel SONOS memory transistors 52 and erasing (turn on) of all the p-channel SONOS memory transistors 64, with negligible residual memory. The drain 86 of the switch transistor 78 is in one embodiment held at 0V, and in another embodiment held at $V_{DD}$, as described above. The total time for this procedure, including initial erase, first residual memory erase and repeat erase can be about 30 mS. The process ends at reference numeral 100.

Unlike the prior art, where voltages in the range of about 3.6V are applied to the gates of the switch transistors 78, the gate of the switch transistor 78 is held at approximately 0V by the drain 56 of the n-channel SONOS memory transistor 52, which is actively on due to the erase voltage applied to its gate 58, so the method of the present invention never applies greater than $V_{DD}$ between the gate 86 of the switch transistor 78 and its drain 84. Therefore, no large leakage appears in the gate oxide of the switch transistor 78. This means that the entire chip can be put in this state at once rather than using hundreds of pulses that would require many seconds and would allow a pirate time to turn the power off.

Persons of ordinary skill in the art will recognize that the voltages applied to the gates 58 and 70 of the respective n-channel and p-channel SONOS memory transistors 52 and 64 in the above example as shown in FIG. 3 are for the exemplary embodiment described and the values shown are in no way intended to limit the extent of the present invention. Such persons will appreciate that the programming and erase voltages employed in any actual embodiment will depend on the geometries and feature sizes, such as gate oxide thicknesses, of the n-channel and p-channel SONOS memory transistors used.

As shown at reference numeral 108 in FIG. 4, $V_{DD}$ may be connected to the core following the simultaneous programming of the n-channel SONOS memory transistors 52 and erasing of the p-channel SONOS memory transistors 64 at either of reference numerals 98 or 106 depending on whether the process at reference numerals 104 and 106 are performed or not. With the n-channel memory transistors 52 turned off and the p-channel memory transistors 64 turned on in all of the configuration memory cells, the $V_{DD}$ potential applied to the push-pull cells 50 is passed through to the switch transistor gates 86, thus turning on the switch transistors 78 in every cell to provide a low impedance path from source 82 to drain 84. Since all the switches are turned on, many or all of the logic outputs in the logic modules are connected together. Under this condition, the logic power supply will have many (usually millions) of low impedance paths to ground, making the chip appear as a short circuit to the power supply and the chip will be destroyed.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

The invention claimed is:

1. An FPGA integrated circuit comprising:
a programmable logic core;
a controller;
a configuration memory array including a plurality of SONOS configuration memory cells, each SONOS configuration memory cell including a p-channel SONOS memory transistor in series with an n-channel SONOS memory transistor, driving a switch transistor coupled to one of a programmable logic element and a programmable interconnect connection of the programmable logic core; and
a tamper detector disposed in the integrated circuit having an output coupled to the controller, the controller configured to cause power to be disconnected from the programmable logic core and to then simultaneously program all of the n-channel SONOS memory transistors and erase all of the p-channel SONOS memory transistors in the configuration memory array in response to a tamper detection signal from the tamper detector.

2. The FPGA integrated circuit of claim 1 wherein the controller is configured to cause power to be disconnected from the programmable logic core by disconnecting $V_{DD}$ from the programmable logic core.

3. The FPGA integrated circuit of claim 1 wherein the controller is configured to cause power to be disconnected from the programmable logic core by disconnecting ground from the programmable logic core.

4. The FPGA integrated circuit of claim 1 wherein the controller is configured to cause power to be re-connected to the programmable logic core after the programming of all of the n-channel SONOS memory transistors and the erasing of all of the p-channel SONOS memory transistors in the configuration memory array.

5. The FPGA integrated circuit of claim 1 wherein the controller is further configured to shift all of the voltage thresholds of the p-channel SONOS memory transistors and the n-channel SONOS memory transistors in a negative direction after simultaneously programming all of the n-channel SONOS memory transistors and erasing all of the p-channel SONOS memory transistors in the configuration memory array.

6. The FPGA integrated circuit of claim 5 wherein the controller is further configured to simultaneously program the n-channel SONOS memory transistor cells and erase the p-channel SONOS memory transistors after shifting all of the voltage thresholds of the p-channel SONOS memory transistors and the n-channel SONOS memory transistors in a negative direction.

7. An FPGA integrated circuit comprising:
a programmable logic core;
a controller;
a configuration memory array including a plurality of SONOS configuration memory cells, each SONOS configuration memory cell including a p-channel SONOS memory transistor in series with an n-channel SONOS memory transistor, driving a switch transistor coupled to one of a programmable logic element and a programmable interconnect connection of the programmable logic core;
a tamper detector disposed in the integrated circuit having an output coupled to the controller; and
a power control switch disposed between the logic core and one of a source of supply voltage for the logic core and a ground connection for the logic core, the power control switch responsive to the controller for connecting and disconnecting power from the programmable logic core;
the controller configured to disconnect power from the programmable logic core via the power control switch and then simultaneously program all of the n-channel SONOS memory transistors and erase all of the p-channel SONOS memory transistors in the configuration memory array in response to a tamper detection signal from the tamper detector.

8. The FPGA integrated circuit of claim 7 wherein the controller is further configured to reconnect power via the power control switch to the programmable logic core after the programming of all of the n-channel SONOS memory transistors and the erasing of all of the p-channel SONOS memory transistors.

9. The FPGA integrated circuit of claim 7 wherein the power control switch is arranged for connecting and disconnecting $V_{DD}$ from the programmable logic core.

10. The FPGA integrated circuit of claim 7 wherein the power control switch is arranged for connecting and disconnecting ground from the programmable logic core.

11. A method for fast data erasing an FPGA including a programmable logic core controlled by a plurality of SONOS configuration memory cells, each SONOS configuration memory cell including a p-channel SONOS memory transistor in series with an n-channel SONOS memory transistor, the method comprising:
detecting tampering with the FPGA;
disconnecting power from the programmable logic core; and
simultaneously programming the n-channel SONOS memory transistors in the SONOS configuration memory cells and erasing the p-channel SONOS memory transistors in the SONOS configuration memory cells.

12. The method of claim 11, further including re-connecting power to the programmable logic core after the programming of the n-channel SONOS memory transistors and the erasing of the p-channel SONOS memory transistors.

13. The method of claim 11 wherein the disconnecting power from the programmable logic core comprises disconnecting $V_{DD}$ from the programmable logic core.

14. The method of claim 11 wherein the disconnecting power from the programmable logic core comprises disconnecting ground from the programmable logic core.

15. The method of claim 11 wherein the simultaneously programming of the n-channel SONOS memory transistors and erasing of the p-channel SONOS memory transistors in all cells comprise:
simultaneously applying a programming potential between a control gate of the n-channel SONOS memory transistor and both of a source of the n-channel SONOS memory transistor and a semiconductor bulk region containing the n-channel SONOS memory transistor;

applying an erase potential between a control gate of the p-channel SONOS memory transistor and both of a source of the p-channel SONOS memory transistor and a semiconductor bulk region containing the p-channel SONOS memory transistor; and applying a potential of about 0V to a gate of a switch transistor arranged between a drain of the p-channel SONOS memory transistor and a drain of the n-channel SONOS memory transistor.

16. The method of claim 15 wherein the programming potential and the erase potential are the same potential.

17. The method of claim 11 wherein the simultaneously programming of the n-channel SONOS memory transistors and erasing of the p-channel SONOS memory transistors in all cells comprise:

simultaneously applying a programming potential between a control gate of the n-channel SONOS transistor and both of a source of the n-channel SONOS transistor and a semiconductor bulk region containing the n-channel SONOS memory transistor, applying an erase potential between a control gate of the p-channel SONOS memory transistor and both a source of the p-channel SONOS memory transistor and a semiconductor bulk region containing the p-channel SONOS memory transistor; and applying a potential of $V_{DD}$ to a gate of a switch transistor arranged between a drain of the p-channel SONOS memory transistor and a drain of the n-channel SONOS memory transistor.

18. The method of claim 11 wherein the programming potential and the erase potential are the same potential.

19. The method of claim 11 further comprising shifting all of the voltage thresholds of the p-channel SONOS memory transistors and the n-channel SONOS memory transistors in a negative direction.

20. The method of claim 19 further comprising, after shifting all of the voltage thresholds of the p-channel SONOS memory transistors and the n-channel SONOS memory transistors in the negative direction, simultaneously programming the n-channel SONOS memory transistors cells and erasing the p-channel SONOS memory transistors.

* * * * *